(12) United States Patent
Ringuette et al.

(10) Patent No.: US 11,921,472 B2
(45) Date of Patent: Mar. 5, 2024

(54) SYSTEM AND METHOD TO SENSE COMPUTING DEVICE PARAMETERS WITHIN AN ENCLOSED SPACE

(71) Applicant: Lenovo (Singapore) Pte. Ltd., New Tech Park (SG)

(72) Inventors: Justin Michael Ringuette, Morrisville, NC (US); Mark K. Summerville, Apex, NC (US); Sandy Collins, Durham, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 42 days.

(21) Appl. No.: 17/501,829

(22) Filed: Oct. 14, 2021

(65) Prior Publication Data

US 2023/0120233 A1    Apr. 20, 2023

(51) Int. Cl.
*G06F 1/20* (2006.01)
*G01F 15/063* (2022.01)
*G01K 1/024* (2021.01)
*G05B 13/02* (2006.01)
*G06F 1/3296* (2019.01)

(52) U.S. Cl.
CPC ......... *G05B 13/024* (2013.01); *G01F 15/063* (2013.01); *G01K 1/024* (2013.01); *G06F 1/3296* (2013.01)

(58) Field of Classification Search
CPC ..................................................... G06F 1/206
See application file for complete search history.

(56) References Cited

U.S. PATENT DOCUMENTS

| | | | | |
|---|---|---|---|---|
| 5,590,061 | A * | 12/1996 | Hollowell, II | G06F 1/206 714/24 |
| 2006/0230294 | A1* | 10/2006 | Chaiken | G06F 1/206 713/300 |
| 2007/0097636 | A1* | 5/2007 | Johnson | H05K 7/20745 361/679.48 |
| 2011/0106332 | A1* | 5/2011 | Lee | G06F 1/206 702/132 |
| 2014/0365793 | A1* | 12/2014 | Cox | G06F 1/3203 713/320 |
| 2015/0220131 | A1* | 8/2015 | Johansson | G06F 1/3231 713/323 |
| 2019/0324517 | A1* | 10/2019 | Keceli | G06F 1/3275 |

* cited by examiner

*Primary Examiner* — Suresh Suryawanshi
(74) *Attorney, Agent, or Firm* — Kunzler Bean & Adamson

(57) ABSTRACT

Apparatuses, methods, systems, and program products are disclosed to determine when a portable electronic device is moved within an enclosed space. A processor and memory may control a sensor may store code executable by the processor to measure a parameter at an inlet of the computing device. The parameter may include an airflow rate, an air temperature at the inlet, and/or a current supply to a fan of the computing device. The processor may execute code to determine when the parameter at the inlet reaches a threshold. When the processor determines that the measured parameter has reached the threshold, a signal from the sensor to the processor and/or from the processor to an operator may be sent, indicating that the threshold has been reached.

16 Claims, 4 Drawing Sheets

SYSTEM AND METHOD TO SENSE COMPUTING DEVICE PARAMETERS WITHIN AN ENCLOSED SPACE

FIELD

The subject matter disclosed herein relates to sensing the environment of a computing device and detects when the environment is not suitable for regular operations of the processor of the computer device, e.g., when a laptop is placed within a tote bag.

BACKGROUND

The environment surrounding a computing device, such as a server, desktop, laptop, cellphone, and/or tablet, may become inadvertently restricted. The present disclosure relates to determining characteristics of the computing environment in real-time.

BRIEF SUMMARY

In one embodiment, a system is described as having a processor, a sensor, and memory. The processor controls the sensor, and the memory stores code executable by the processor to determine when a portable electronic device is moved within an enclosed space. The system measures a parameter of airflow rate, air temperature, or current supply at an inlet of a computing device and determines when the measured parameter at the inlet reaches a threshold. In response to the sensor determining that the parameter reached the threshold, the system sends a signal.

In one embodiment, a method measures a parameter using a sensor electronically coupled to a processor. The sensor has a threshold calibrated to determine that the portable electronic device has been placed within an enclosed space. When the method determines that the parameter has reached the calibrated threshold a signal is transmitted.

In another embodiment, a computer program product with a computer-readable storage medium having program instructions embodied therewith is described. The program instructions are executable by a processor to cause the processor to measure a parameter of airflow rate, air temperature, or current supply at an inlet of a computing device to determine when a portable electronic device is moved within an enclosed space. The computer program product determines, using a sensor electronically coupled to the processor when the parameter at the inlet reaches a threshold and sends a signal in response to the parameter at the inlet reaching the threshold.

BRIEF DESCRIPTION OF THE DRAWINGS

A more particular description of the embodiments briefly described above will be rendered by reference to specific embodiments illustrated in the appended drawings. Understanding that these drawings depict only some embodiments and are not, therefore, to be considered to be limiting of scope, the embodiments described and explained with additional specificity and detail through the use of the accompanying drawings, in which.

DETAILED DESCRIPTION

Changes in the computing environment of a computing device may increase the operating temperature, speed of the processor, current/voltage distributed to components of the computing device, and/or fan rotations per minute (RPM). Measurement of a parameter related to the airflow rate, air temperature, or current supply of the environment surrounding the computing device over time may enable the detection of changes to the environment and/or enclosed space surrounding the computing device. The computing device may operate in an enclosed space, such as a bag, at a safe but elevated temperature that is uncomfortable to the touch. The temperature at which the computing device becomes "uncomfortable" may not be a universal absolute value. For example, sensing an absolute thermal limit when the device is in the bag may limit the performance metrics for the computing device. Similarly, an incorrect determination of the placement of the computing device, e.g., detecting that it is outside a bag when it is within the bag, may result in inefficient performance.

Determining the pertinent parameters of the device may vary based on the location and/or environment of the computing device. For example, the computing device may establish lower thermal limits when the device senses motion, e.g., on a user's lap, but may not be effective if the computing device is placed in a bag (e.g., a backpack) and carried. Similarly, allowing elevated safe thermal limits when within an enclosed bag may be difficult if the bag is stored in a stationary position (e.g., resting on the floor) or carried or placed in a moving vehicle.

In this example, the present disclosure detects restricted airflow based on parameters in the surrounding environment. The system may detect when a computing device, e.g., laptop, is placed within an enclosed space, such as a laptop bag, based on changes to the set of operating parameters, such as the operating temperature of the processor. The system may detect the restricted airflow within the bag by monitoring the inlet air temperature, the fan RPM for current load, and/or the airflow rate through the enclosed system. In other words, the system may detect measured parameters of the surrounding environment related to the internal parameters to control the operation of the computing device and/or processor. When a relative threshold measurement (e.g., the difference between inlet and outlet temperatures) reaches or exceeds a threshold, the system may decrease the system power to the processor to reduce or maintain operating temperatures within the enclosed bag. This may reduce user discomfort, e.g., when removing the laptop from a bag. The system may then restore system power when the temperature (or other relevant parameters) are within the threshold values.

Figure 1:
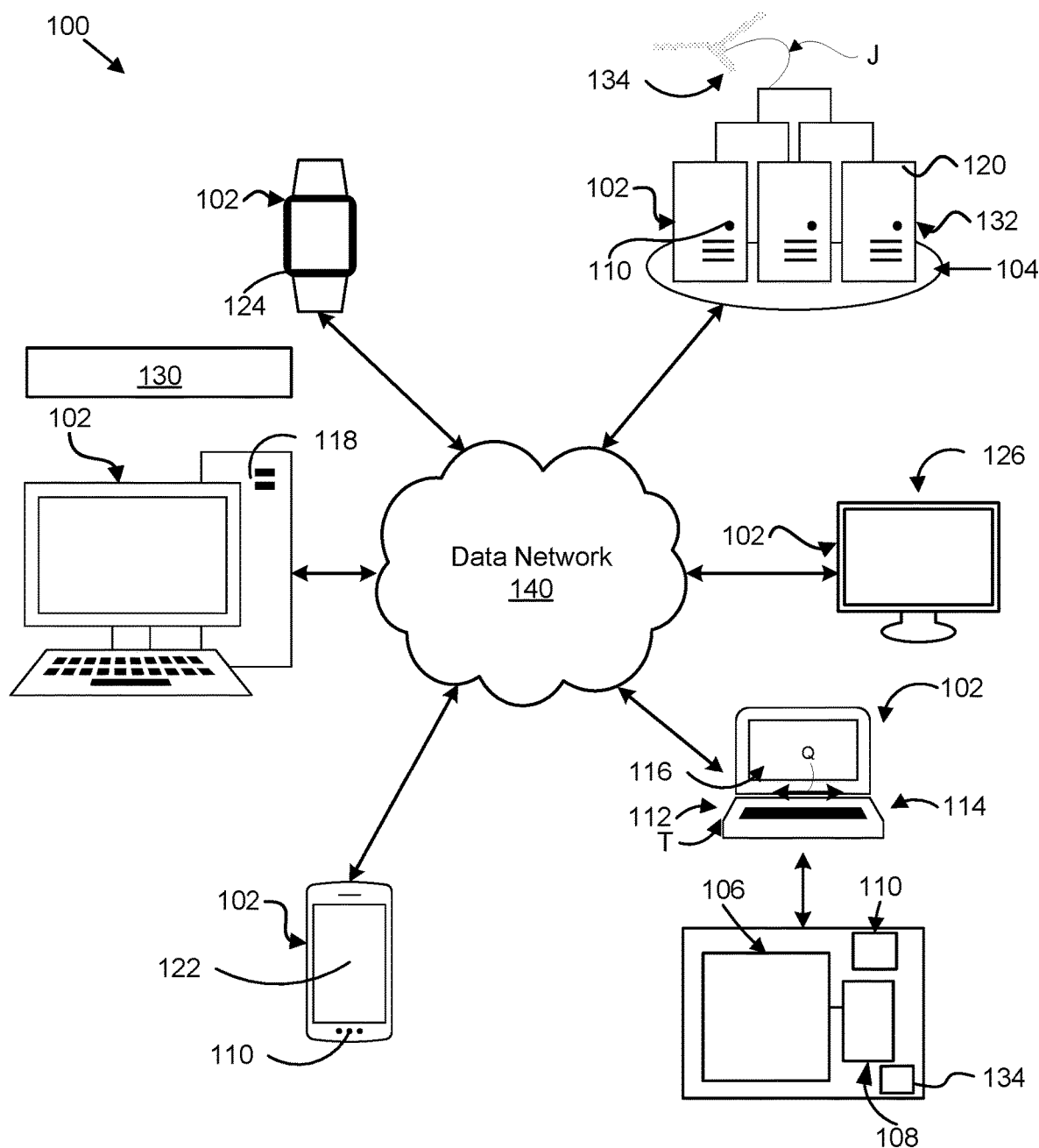
FIG. 1 is a schematic block diagram illustrating one embodiment of a system for system and method to sense computing device placement within an enclosed space.

FIG. 1 shows a system 100 for various computing devices 102. The system 100 senses placement of the computing device 102 within an enclosed space 104. In general, the computing device 102 may include a processor 106, memory 108, and a sensor 110. The sensor 110 can be controlled by the processor 106 to measure a parameter such as an airflow rate $\overline{Q}$, an air temperature T, and/or an electrical current load shown as current supply J, e.g., at an inlet 112 of the computing device 102. In various embodiments, the parameter may be measured as an absolute value and/or relative value, e.g., a difference or ratio of the inlet 112 and an outlet 114 measurement of the parameter. The memory 108 of the computing device 102 may store code executable by the processor 106 and/or may store the various absolute and/or relative data measurements taken by the sensor 110.

The computing device 102 may be a laptop 116, a desktop 118, a server 120, and/or a personal computing device 102 such as a cellphone 122, a watch 124, and/or a tablet 126. A portable computing device 102 may include the laptop 116 and personal computing devices such as the cellphone 122, the watch 124, and/or the tablet 126, or may include devices such as the desktop 118 and/or the server 120. The enclosed space 104 is an environment that may obstruct airflow and/or otherwise alter the operating conditions of the computing device 102. For example, the enclosed space 104 may be a laptop bag 128, a desktop cover 130, a server rack 132, and/or an inadvertent airflow obstruction, such as loose paper or other debris.

The system 100 determines when a portable or an electronic computing device 102, e.g., laptop 116, is moved within an enclosed space 104, such as the laptop bag 128. Similarly, the system 100 detects when the desktop 118 is covered with a desktop cover 130 and/or airflow to the server 120 is obstructed by the server rack 132 or other debris. The system 100 determines when the measured parameter at the inlet 112 reaches a threshold and sends a signal in response to the sensor 110 determining that the parameter reached the threshold. As used herein, the threshold is a relative and/or absolute parameter value that establishes a limit or tolerance value for the parameter. For example, the system 100 may include an absolute threshold value for the airflow rate $\overline{Q}$ and/or the air temperature T at the inlet 112 and/or the current supply J to a fan 134 that cools the computing device 102. Also, the system 100 may include relative threshold values of the airflow rate $\overline{Q}$, the air temperature T, and/or the RPM of the fan 134 related to the current supply J. As another example, the system 100 may include a relative threshold for the difference of one or more parameters at the inlet 112 and the outlet 114.

The system 100 disclosed herein is the placement of a laptop 116 within a laptop bag 128 or carrying case such as a sleeve or backpack with severely restricted airflow. However, it is understood that the system 100 applies more broadly and includes restricted airflow to desktop computers 118, servers 120, cellphones 122, watches 124, tablets 126, and/or other computing devices 102 having an electronic processor 106 and memory 108. The system 100 may detect uncomfortable elevated temperatures even though they pose limited or no safety or device overheating concerns. For example, the system 100 may detect elevated temperatures that cause discomfort on the user's skin but pose no risk to overheating the processor 106. The system 100 may detect elevated temperatures in some embodiments and shut down the processor 106 to prevent physical damage.

Figure 2A:
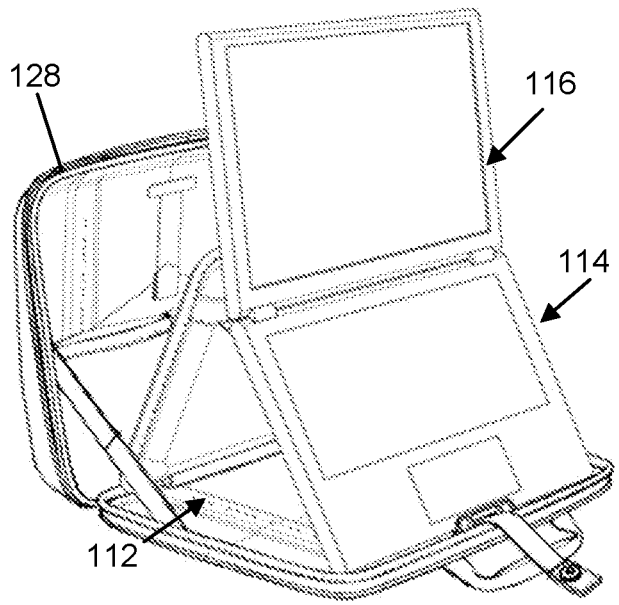
FIG. 2A is a schematic diagram illustrating an embodiment of a system for determining parameters of a laptop being placed in an enclosed space of a laptop bag.
Figure 2B:
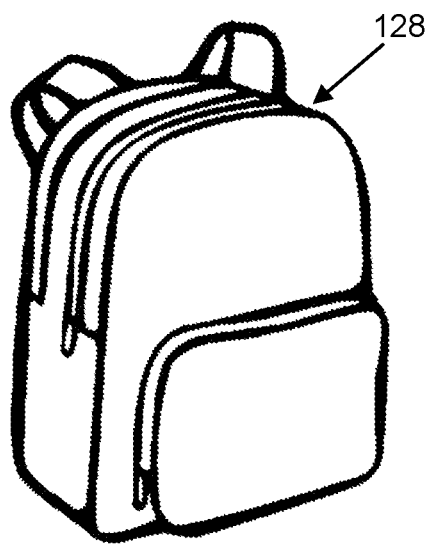
FIG. 2B is a schematic diagram illustrating an embodiment of a system for determining parameters of a laptop being placed in an enclosed space of a laptop bag.

FIGS. 2A and 2B show the laptop 116 being placed in the enclosed space 104 of the laptop bag. In an enclosed space 104, even a low power permissive state of a computing device 102, e.g., on a desk, may have an elevated wattage and/or temperature because exhausted heat is concentrated. In some embodiments, the system 100 may detect an uncomfortable temperature threshold that a user senses as hot against the skin that remains below a tolerance limit for the safe operation of the processor 106 and/or computing device 102. Various sensors 110 may determine a temperature threshold and/or identify when the computing device 102 operates within the enclosed space 104.

The sensor 110 may include an accelerometer, a thermometer, a current sensor, and/or the RPM of the fan 134. For example, the accelerometer may detect vibrational forces or movements to detect when the laptop 116 is resting on a user's lap or carried, e.g., in the laptop bag 128. The sensor 110 may signal the processor 106 to initiate a low power state that reduces the temperature of the laptop 116 against the user's skin. The thermal threshold of the skin contact may have a lower thermal limit than the laptop 116 within the laptop bag 128.

In various embodiments, the sensor 110 may detect restricted airflow through the enclosed space 104 of the computing device to trigger the thermal threshold condition. In other words, the system 100 may use a lessened thermal limit or threshold to prevent discomfort when the computing device 102 is detected to be outside the laptop bag 128 than when the computing device 102 is determined to be operating safely at an elevated temperature within the laptop bag 128. The system 100 may use the sensor 110 to measure the air temperature T at the inlet 112, the outlet 114, and/or in the enclosed space 104. Air restriction in the enclosed space 104 may result in reduced volumes of recirculated air detected as an increased measurement of the air temperature T at the inlet 112. Similarly, the relative temperature of the inlet 112 and the outlet 114 may be reduced (e.g., approach zero) since the exhausted air at the outlet 114 is returned to the inlet 112.

Accordingly, one such parameter that may be measured by the system 100 includes the relative and/or absolute air temperature T at the inlet 112. For example, the air temperature T at the inlet 112 may be measured relative to the air temperature T at an outlet 114. When the relative or absolute air temperature T at the inlet 112 reaches a threshold value, the sensor 110 sends a signal. The signal indicates to the processor 106 that the parameter (e.g., the air temperature T measured at the inlet 112 has reached the threshold. In one example, the threshold is reached when the difference between the air temperature T at the inlet 112 and the outlet 114 is less than or equal to 5° C., 4° C., 3° C., 2° C., or 1° C.

Another parameter that may be measured by system 100 includes the RPM of the fan 134 and/or current supply J on the airflow rate $\overline{Q}$. The RPM of the fan 134 may be measured directly and independently from the current supply J supplied to the fan 134. Similarly, the current supply J supplied to the fan 134 may be measured directly and independently from the RPM of the fan 134 to detect when the computing device 102 is operating within an enclosed space 104.

The RPM of the fan 134 and/or current supply J supplied to the fan 134 may be measured relative to one another and/or be proportionally related. Specifically, the fan 134 is related to the torque applied to the fan 134 to circulate air. More free-flowing air, e.g., in unrestricted environments, results in more RPMs of the fan 134 based on the current supplied. Conversely, in an enclosed space 104, the current supplied to the fan 134 results in relatively fewer RPMs. When the air is unrestricted, the fan 134 has a higher RPM for a specific current supply J. The fan 134 has a lower RPM for the same specific current supply J when the air is restricted.

Accordingly, a relative association of the RPM of the fan 134 and the electric current supply J to the fan 134 can be measured to correlate and measure the airflow rate $\overline{Q}$. This relative measurement may measure the resistance of the inlet 112 and outlet 114, e.g., within an enclosed space 104. In other words, when the sensor 110 determines that the RPM of the fan 134 is low relative to the supplied current to the fan 134, the system 100 may determine that the air vents (inlet 112 and/or outlet 114) are restricted and the computing device 102 is in an enclosed space 104.

Figure 3:
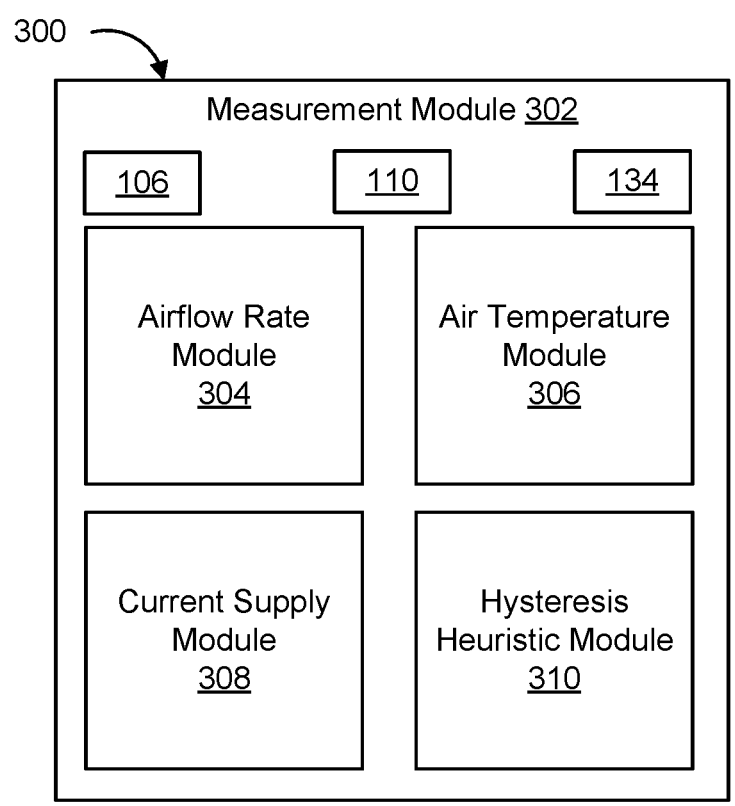
FIG. 3 is a schematic diagram illustrating one embodiment of a relative sensing module for determining relative differences between the enclosed space or environment of the computing device.

FIG. 3 shows a sensing module 300 for determining relative differences between the enclosed space 104 of the computing device 102. The sensing module 300 includes a processor 106, a measurement module 302 coupled to a sensor 110, an airflow rate $\overline{Q}$ module 304, an air temperature T module 306, a current supply J module 308, a hysteresis heuristic module 310, and/or a fan 134. The airflow rate $\overline{Q}$ module 304 uses the sensor 110 to detect the airflow rate $\overline{Q}$ within the enclosed space 104, such as the inlet 112 and/or the outlet 114 of the computing device 102. Similarly, the air temperature T module 306 measures the air temperature T at a point within the sensing module 300, such as the inlet 112 and/or the outlet 114 of the computing device 102.

The current supply J module 308 measures the electrical current load to power the fan 134. The hysteresis heuristic module 310 may regulate any of the above parameters through time. For example, the hysteresis heuristic module 310 may use rapid changes in the absolute value of a measured parameter to quickly determine whether the computing device 102 has been located within an enclosed space 104.

As disclosed above, the measured parameters may include the RPM of the fan 134, the current supply J to the fan 134, the airflow rate $\overline{Q}$, and/or the air temperature T at the inlet 112 can be measured directly to detect when the computing device 102 is located within an enclosed space 104. Specifically, when the computing device 102 is placed within the enclosed space 104, such as a laptop bag 128 or a desktop cover 130, one or more sensors 110 may measure various parameters and use the measured absolute and/or relative measurements to determine whether the computing device 102 is located in an enclosed space 104, e.g., where airflow is restricted.

As a specific example, the enclosed space 104 results in limited hot recirculated air returned to the inlet 112. The recirculated air uses more suction to pull the air in the enclosed space 104 through the computing device 102. The RPM of fan 134 increases, and the airflow volume is reduced, resulting in a higher current supply J supplied to the fan 134. Moreover, the air temperature T is elevated because the exhaust at the outlet 114 is recirculated through the inlet 112. Accordingly, measurement of the air temperature T at the inlet 112, the electrical load supplied to the fan 134, the RPM of the fan 134, and/or the volume of air passing through the inlet 112 may be independently and measured relative to a threshold value to detect when the computing device 102 is located within an enclosed space 104.

In other embodiments, relative measurements of two or more parameters may define a relative measurement parameter to detect an enclosed space 104. Moreover, differential parameter measurements between the inlet 112 and outlet 114 may provide a relative threshold indicating when the computing device 102 is located within an enclosed space 104. In other words, either the relative or the absolute measurement of one or more parameters at the inlet in isolation may be used to determine whether the computing device 102 is within an enclosed space 104.

In some embodiments, a hysteresis heuristic may measure the parameter at the inlet 112 over time. For example, the sensing module 300 may monitor a normal operating range of a parameter such as the air temperature T at the inlet 112 at approximately 35° C., such that the threshold temperature is greater than 35° C. as described above. However, the hysteresis heuristic may determine a rapid change in the air temperature T at the inlet 112 over time and determine that the computing device 102 is stored within an enclosed space 104 even though the absolute temperature is less than the threshold temperature.

For example, if the air temperature T changes in a short period of time from 25° C. to 35° C., the sensing module 300 may determine that the computing device 102 is located within an enclosed space 104, such as a laptop bag 128. The computing device 102 may include the sensor 110 that detects a rapid change in the absolute measurement of a parameter against a hysteresis heuristic to determine whether the computing device 102 has a restricted airflow caused by an enclosed space 104. In various embodiments, the sensor 110 may be located outside the computing device 102, for example, in the enclosed space 104 such as the laptop bag 128, the desktop cover 130, or on a server rack 136. Similarly, the computing device 102 may include a cellphone, and the enclosed space 104 may be the user's pocket. When the sensing module 300 detects that the cellphone is placed within the user's pocket, the sensing module 300 may reduce power to the processor 106 to reduce the temperature of the cellphone and prevent discomfort against the user's skin.

The hysteresis or heuristic can measure changes in the parameter over time. For example, the heuristic may monitor a trend of the parameter and send the signal to the processor 106 that the parameter has reached the threshold when the parameter changes by 2.5%, 5%, 7.5%, 10%, or more. The hysteresis may use absolute or relative measurements over time in the hysteresis. For example, a moving average or other trend data may provide a faster response time for determining that the computing device 102 is within an enclosed space 104. Moreover, a combination of absolute thresholds for a parameter may be used with the heuristic measuring a parameter through time.

In various embodiments, the sensor 110 may include an accelerometer that measures the vibration of the portable electronic computing device 102. For example, the accelerometer within the sensor 110 may use vibration sensing to determine that the laptop 116 is being used on the user's lap. Based on such a determination, the sensor 110 may run the processor 106 in a lower power mode to maintain a cool and/or quiet operation of the computing device 102 (e.g., laptop 116). In various embodiments, the sensor 110 measures airflow parameters through the computing device 102 and vibration sensing, e.g., with an accelerometer.

In various embodiments, sensing module 300 may transmit a signal to the processor 106 and/or a human operator, such as the user. The sensing module 300 may signal the operator regarding the measured data at the inlet 112 and/or outlet 114 of the computing device 102. The signal may be in the form of an alarm or an alert. The signal may be haptic, audio, visual, and/or a combination. The signal may indicate that, e.g., the desktop 118 and/or a workstation or server 120 is in a restricted airflow environment or enclosed space 104. For example, following installation, the sensing module 300 may indicate to the user that the computing device 102 has potentially been installed improperly and/or sub-optimally, resulting in a restricted airflow through the enclosed space 104. The signal may indicate that the desktop 118 or server 120 are operating slower and hotter due to improper installation and/or a change in the enclosed space 104 surrounding the computing device 102.

In various embodiments, the signal may be sent electronically to the processor 106. In this configuration, the sensor may cause the processor 106 to operate in a low power mode, e.g., when the computing device 102 is detected in an enclosed space 104 and/or on a user's lap following removal from the enclosed space 104. The signal may cause the processor 106 to operate in a low power permissive state when the processor 106 is restored to regular system power in response to receiving a signal from the sensor 110 that the parameter is outside the threshold. For example, the signal may indicate that the portable electronic computing device 102 has been removed from the enclosed space 104 and operated at an elevated temperature.

The sensing module 300 of the system 100 may measure the parameter related to the current supply J of the fan 134. For example, the parameter may be related to a parameter of the airflow rate $\overline{Q}$ and/or the air temperature T at the inlet 112. In a specific example, the current supply J is measured relative to the airflow rate $\overline{Q}$ at the inlet 112, and the airflow rate $\overline{Q}$ is measured by counting the number of revolutions (e.g., RPM) of the fan 134 per unit time. The signal may be sent to the processor 106 and/or the user, indicating that the threshold has been met when the parameters for the current supply J and the revolutions per unit time are increased over a baseline value.

Figure 4:
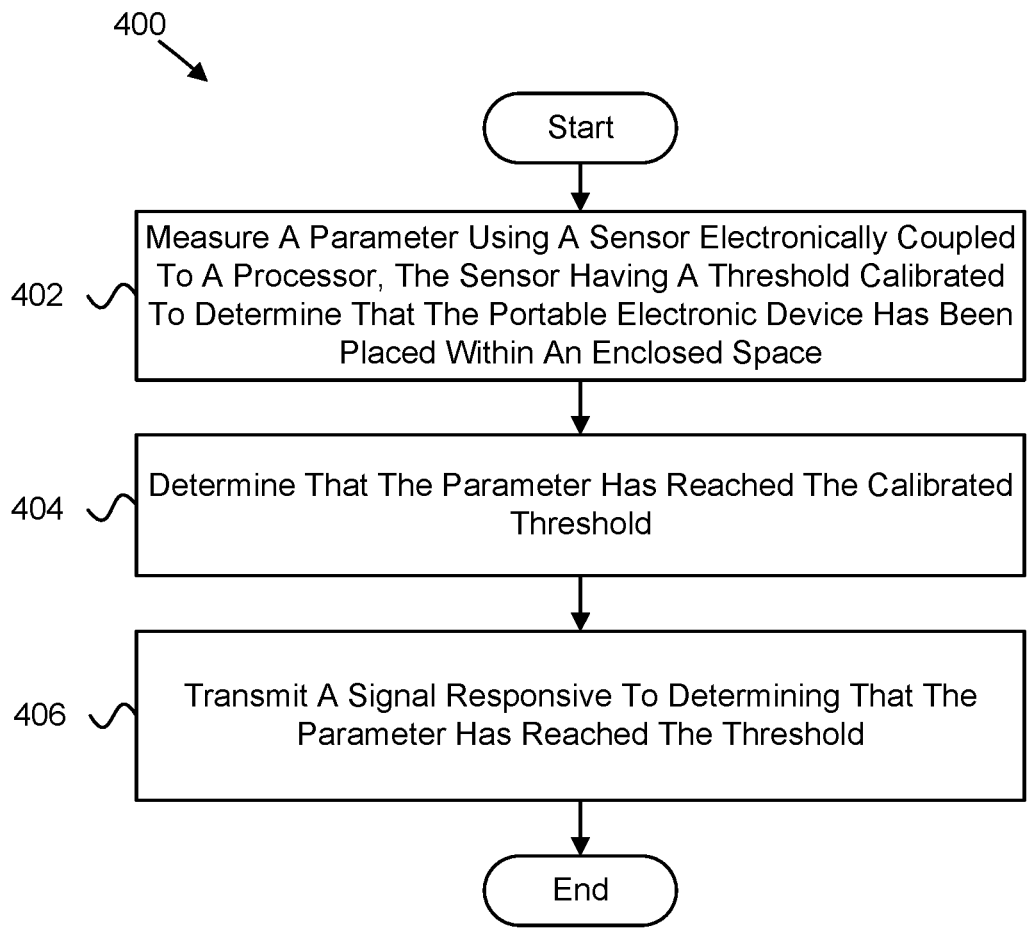
FIG. 4 is a schematic flow chart diagram illustrating a method for measuring a parameter to determine a threshold to detect changes in the enclosed space of the computing device.

FIG. 4 is a schematic flow chart diagram illustrating a method 400 for measuring a parameter to determine a threshold to detect changes in the enclosed space 104 of the computing device 102. The method 400 measures a parameter 402 selected from the group consisting of an airflow rate $\overline{Q}$, an air temperature T, and a current supply J at an inlet 112 of a computing device 102. The method 400 may operate over time to determine when a portable electronic device is moved within an enclosed space 104 and may determine 404 when the parameter at the inlet has reached a calibrated threshold. The method may send and/or transmit a signal 406 in response to the parameter reaching the threshold.

In some embodiments, the method 400 measures a relative difference of the air temperature T at an outlet 114 of the computing device 102 relative to the air temperature T at the inlet 112 of the computing device 102. A signal may be sent in response to the difference of the air temperature T at the inlet 112 and the outlet 114 being less than or equal to 5° C.

The portable electronic device or computing device 102 may be selected from the group consisting of a laptop 116, a desktop 118, a cellphone, and a server 120, and the enclosed space 104 may be selected from the group consisting of a laptop bag 128, a desktop cover 130, a pocket, and a server rack 132, respectively. The measurement of the parameter may be as an absolute value or a relative measurement. In some embodiments, a heuristic may monitor a trend of the parameter over time and send the signal that the parameter has reached the threshold in response to the parameter changing by 5% or more over a time period.

The sensor 110 may be an accelerometer that measures a vibration of the portable electronic computing device 102, and/or the processor 106 may send the signal to a human operator in response to the parameter reaching the threshold. The computing device 102 may operate in a low power mode in response to sending the signal to the processor 106.

In some embodiments, the parameter may be a relative measurement of the current supply J of a fan relative to at least one of the parameters for the airflow rate $\overline{Q}$ or the air temperature T at the inlet 112. The current supply J may be measured relative to the airflow rate $\overline{Q}$ at the inlet 112, and the airflow rate $\overline{Q}$ can be measured by the number of revolutions of the fan per unit time. The threshold may be determined to be met in response to the parameters for the current supply J and/or the revolutions per unit time increasing over a baseline value.

In various embodiments, the system is described as having a processor, a sensor, and memory. The processor controls the sensor. The memory stores code executable by the processor to determine when a portable electronic device is moved within an enclosed space. The processor executes the code to measure a parameter of airflow rate $\overline{Q}$, air temperature T, or current supply J at an inlet of a computing device and determine when the parameter at the inlet reaches a threshold. The processor sends a signal in response to the sensor, determining that the parameter has reached the threshold.

The air temperature T at the inlet is measured relative to the air temperature T at an outlet. For example, the sensor sends the signal indicating that the parameter of air temperature T has reached the threshold when a difference between the inlet temperature and the outlet temperature is less than or equal to 5° C., 3° C., or 2° C.

In embodiments, the portable electronic device is selected from the group consisting of a laptop, a desktop, and a server. The enclosed space is selected from the group consisting of a laptop bag, a desktop cover, and a server rack. The parameter may be measured as an absolute value.

In some embodiments, a heuristic measures changes in the parameter over time. For example, the heuristic monitors a trend for the parameter and sends the signal that the parameter has reached the threshold when the parameter changes by 2.5%, 5%, 7.5%, 10%, or more. An accelerometer may measure the vibration of the portable electronic device.

In various embodiments, the signal may be sent to a human operator, and/or the signal may be sent electronically to the processor and causes the processor to operate in a low power mode. The signal may cause the processor to operate in a low power permissive state. For example, the processor may be restored to regular system power in response to receiving a signal from the sensor that the parameter is outside the threshold, indicating that the portable electronic device has been removed from the enclosed space.

In various embodiments, the system measures the parameter for the current supply J of a fan relative to at least one of the parameters for the airflow rate $\overline{Q}$ and the air temperature T at the inlet. The current supply J may be measured relative to the airflow rate $\overline{Q}$ at the inlet. For example, the airflow rate $\overline{Q}$ may be measured by the number of revolutions of the fan per unit time. The signal may be sent indicating that the threshold is met when the parameters for the current supply J and the revolutions per unit time are met increased over a baseline value.

In another embodiment, a method includes measuring a parameter using a sensor electronically coupled to the processor. The sensor having a threshold calibrated to determine that the portable electronic device has been placed within an enclosed space. In various embodiments, the parameter is selected from the group consisting of an airflow rate $\overline{Q}$, an air temperature T, and a current supply J at an inlet of a computing device over time to determine when a portable electronic device is moved within an enclosed space. When the method determines that the parameter at the inlet has reached the calibrated threshold, the method transmits a signal. The signal is sent in response to determining that the parameter has reached the threshold.

A difference of the air temperature T at an outlet of the computing device is measured relative to the air temperature T at the inlet. In embodiments, a signal is sent in response to the difference in air temperature T between the inlet temperature and the outlet temperature being less than or equal to 5° C., 3° C., or 2° C.

In various embodiments, the portable electronic device is selected from the group consisting of a laptop, a desktop, and a server. The enclosed space may be selected from the group consisting of a laptop bag, a desktop cover, and a server rack. The parameter may be measured as an absolute value.

In some embodiments, a heuristic may monitor a trend for the parameter and transmit a signal that the parameter has reached the threshold in response to the parameter changing by 2.5%, 5%, 7.5%, 10%, or more.

The method may use an accelerometer to measure the vibration of the portable electronic device.

The method may send the signal to a human operator in response to the parameter reaching the threshold and/or the processor to operate the processor in a low power mode in response to sending the signal to the processor.

The method may measure a parameter for the current supply J of a fan relative to at least one of the parameters for the airflow rate $\overline{Q}$ or the air temperature T at the inlet. For example, the current supply J may be measured relative to the airflow rate $\overline{Q}$ at the inlet. In specific examples, the airflow rate $\overline{Q}$ may be measured by the number of revolutions of the fan per unit time. The threshold may be determined to be met in response to the parameters for the current supply J and the revolutions per unit time increasing over a baseline value.

In another embodiment, a computer program product may include a computer-readable storage medium with program instructions. The program instructions may be executable by a processor to cause the processor to measure a parameter of airflow rate $\overline{Q}$, air temperature T, or current supply J at an inlet of a computing device to determine when a portable electronic device is moved within an enclosed space. The program may use a sensor electronically coupled to the processor to determine when the parameter at the inlet reaches a threshold and transmit a signal in response to the parameter at the inlet reaching the threshold.

As appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, embodiments may take the form of a program product embodied in one or more computer-readable storage devices storing machine-readable code, computer-readable code, and/or program code, referred hereafter as code. The storage devices may be tangible, non-transitory, and/or non-transmission. The storage devices may not embody signals. In a specific embodiment, the storage devices only employ signals for accessing code.

Many of the functional units described in this specification have been labeled as modules to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices, or the like.

Modules may also be implemented in code and/or software for execution by various types of processors. An identified module of code may, for instance, comprise one or more physical or logical blocks of executable code, which may, for instance, be organized as an object, procedure, or function. Nevertheless, the executables of an identified module need not be physically located together but may comprise disparate instructions stored in different locations that, when joined together logically, comprise the module and achieve the module's stated purpose.

A code module may be a single instruction or many instructions and may even be distributed over several different code segments, among various programs, and across several memory devices. Similarly, operational data may be identified and illustrated within modules and embodied in any suitable form, and organized within any appropriate data structure type. The operational data may be collected as a single data set or distributed over different locations, including other computer-readable storage devices. Where a module or portions of a module are implemented in software, the software portions are stored on one or more computer-readable storage devices.

Any combination of one or more computer-readable mediums may be utilized. The computer-readable medium may be a computer-readable storage medium. The computer-readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific embodiments (a non-exhaustive list) of the storage device would include the following: an electrical connection having one or more wires, a portable computer diskette, a hard disk, a random-access memory (RAM), a read-only memory (ROM), an (electronically) erasable programmable read-only memory (EPROM, EEPROM, and/or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for various embodiments may be written in any combination of one or more programming languages, including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer, or entirely on the remote computer or server. In the latter scenario, the remote computer may connect to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all the items are mutually exclusive unless expressly specified otherwise. The terms "a," "an," and "the" also refer to "one or more" unless expressly specified otherwise.

Furthermore, the described features, structures, or characteristics of the embodiments may combine in any suitable manner. The following description provides numerous specific details, such as embodiments of programming, software modules, user selections, network transactions, database queries, database structures, hardware modules, hardware circuits, hardware chips, etc., to provide a thorough understanding of embodiments. However, one skilled in the relevant art would recognize that embodiments may be practiced without one or more of the specific details or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. Each block of the schematic flowchart diagrams and/or schematic block diagrams, and combinations of blocks in the schematic flowchart diagrams and/or schematic block diagrams, can be implemented by code. This code may be provided to a processor of a general-purpose computer, a cellphone, a special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, another programmable machine, or other devices to produce a computer-implemented process such that the code which executes on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical functions.

It should also be noted that, in some alternative implementations, the functions noted in the block may occur out of the order noted in the Figures. For example, two blocks shown in succession may be executed substantially concurrently, or the blocks may sometimes be executed in the reverse order, depending upon the functionality involved. Other steps and methods may be conceived equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may indicate only the logical flow of the depicted embodiment. For instance, an arrow may indicate a waiting or monitoring period of unspecified duration between the illustrated embodiment's enumerated steps. Each block of the block diagrams and/or flowchart diagrams, and combinations of blocks in the block diagrams and/or flowchart diagrams, can be implemented by particular/special purpose hardware-based systems that perform the specified functions or acts or combinations of special purpose hardware and code.

The description of elements in each figure may refer to elements of proceeding figures. Like numbers refer to like elements in all figures, including alternate embodiments of like elements. In various embodiments, an apparatus with a processor and memory that stores code is described.

Embodiments may be practiced in other specific forms. The described embodiments are to be considered in all respects only as illustrative and not restrictive. Therefore, the scope of the invention is indicated by the appended claims rather than by the foregoing description. All changes which come within the meaning and range of equivalency of the claims are to be embraced within their scope.

What is claimed is:

1. A system located within an enclosed space, the system comprising:
    a processor;
    a sensor that is controlled by the processor, the sensor configured to measure a parameter selected from a group consisting of an airflow rate, an air temperature, and a current supply for a computing device;
    a memory that stores code executable by the processor to:
        receive the parameter from the sensor;
        determine when the parameter reaches a threshold, wherein the parameter includes a difference between the air temperature at an inlet of the computing device and the air temperature at an outlet of the computing device; and
        operate in a low power mode in response to determining that the parameter reached the threshold.

2. The system of claim 1, wherein the threshold includes the difference between the inlet temperature and the outlet temperature being less than or equal to 5° C.

3. The system of claim 1, wherein the computing device is selected from a group consisting of a laptop, a desktop, and a server, and the enclosed space is selected from the group consisting of a laptop bag, a desktop cover, and a server rack, respectively, and wherein the parameter is measured as an absolute value.

4. The system of claim 1, further comprising a heuristic that measures changes in the parameter over time, and wherein the heuristic monitors a trend for the parameter and the processor determines that the parameter has reached the threshold when the parameter changes by 5% or more.

5. The system of claim 1, further comprising an accelerometer that measures vibration of the computing device.

6. The system of claim 1, wherein the signal causes the processor to operate in a low power permissive state, and wherein the processor is restored to regular system power in response to receiving a signal from the sensor that the parameter is outside the threshold, indicating that the computing device has been removed from the enclosed space.

7. The system of claim 1, wherein the system measures the parameter for the current supply of a fan relative to at least one of the parameters for the airflow rate and the air temperature at the inlet.

8. The system of claim 7, wherein the current supply is measured relative to the airflow rate at the inlet, wherein the airflow rate is measured by the number of revolutions of the fan per unit time, and wherein the processor determines that the threshold is met when the parameters for the current supply and the revolutions per unit time are increased over a baseline value.

9. A method comprising:
measuring a parameter using a sensor electronically coupled to a processor of a portable electronic device, the parameter being selected from a group consisting of an airflow rate, an air temperature, and a current supply for the portable electronic device;
determining that the parameter has reached the calibrated threshold, wherein the parameter includes a difference between the air temperature at an inlet of the portable electronic device and the air temperature at an outlet of the portable electronic device; and
operating the portable electronic device in a low power mode responsive to determining that the parameter has reached the calibrated threshold.

10. The method of claim 9, wherein the threshold includes the difference of the air temperature between the inlet temperature and the outlet temperature being less than or equal to 5° C.

11. The method of claim 9, wherein the portable electronic device is selected from a group consisting of a laptop, a desktop, and a server, and the enclosed space is selected from a group consisting of a laptop bag, a desktop cover, and a server rack, respectively, and further comprising measuring the parameter as an absolute value.

12. The method of claim 9, further comprising monitoring a trend for the parameter with a hysteresis heuristic and determining that the parameter has reached the threshold in response to the parameter changing by 5% or more.

13. The method of claim 9, further comprising measuring with an accelerometer a vibration of the portable electronic device.

14. The method of claim 9, further comprising measuring the parameter for the current supply of a fan relative to at least one of the parameters for the airflow rate or the air temperature at the inlet.

15. The method of claim 14, further comprising measuring the current supply relative to the airflow rate at the inlet, wherein the airflow rate is measured by the number of revolutions of the fan per unit time and further comprising determining that the threshold is met in response to the parameters for the current supply and the revolutions per unit time increasing over a baseline value.

16. A computer program product, comprising a computer-readable storage medium having program instructions embodied therewith, the program instructions are executable by a processor to cause the processor to:
measure, by use of a sensor electronically coupled to the processor, a parameter of the group consisting of an airflow rate, an air temperature, and a current supply at an inlet of a computing device to determine when a portable electronic device is moved within an enclosed space;
determine when the parameter at the inlet reaches a threshold, wherein the parameter includes a difference between the air temperature at an inlet of the portable electronic device and the air temperature at an outlet of the portable electronic device; and
operate the portable electronic device in a low power mode in response to the parameter at the inlet reaching the threshold.

* * * * *